US007123580B2

(12) United States Patent
Tang et al.

(10) Patent No.: US 7,123,580 B2
(45) Date of Patent: Oct. 17, 2006

(54) MULTIPLE USER ADAPTIVE MODULATION SCHEME FOR MC-CDMA

(75) Inventors: Clive K Tang, Irving, TX (US); Victor J Stolpman, Dallas, TX (US)

(73) Assignee: Nokia Corporation, Espoo (FI)

( * ) Notice: Subject to any disclaimer, the term of this patent is extended or adjusted under 35 U.S.C. 154(b) by 143 days.

(21) Appl. No.: 10/760,033

(22) Filed: Jan. 16, 2004

(65) Prior Publication Data

US 2005/0157670 A1 Jul. 21, 2005

(51) Int. Cl.
*H04B 7/216* (2006.01)
(52) U.S. Cl. .................................. 370/210; 370/342
(58) Field of Classification Search ................ 370/335, 370/342, 343, 430, 441; 375/220, 221, 222
See application file for complete search history.

(56) References Cited

U.S. PATENT DOCUMENTS

| | | | |
|---|---|---|---|
| 2001/0031014 A1* | 10/2001 | Subramanian et al. | 375/260 |
| 2003/0223354 A1* | 12/2003 | Olszewski | 370/208 |
| 2004/0233918 A1* | 11/2004 | Larsson et al. | 370/400 |
| 2005/0031047 A1* | 2/2005 | Maltsev et al. | 375/260 |
| 2005/0032514 A1* | 2/2005 | Sadri et al. | 455/522 |
| 2005/0063345 A1* | 3/2005 | Wu et al. | 370/335 |
| 2005/0090205 A1* | 4/2005 | Catreux-Erceg et al. | 455/78 |
| 2005/0152466 A1* | 7/2005 | Maltsev et al. | 375/260 |

OTHER PUBLICATIONS

"An Overview of Multi-Carrier CDMA", Prasad, Ramjee et al., IEEE 1996, pp. 107-114.

"Multicarrier CDMA for future generation mobile communication", McCormick, A.C. et al., Electronics & Communication Engineering Journal, Apr. 2002, pp. 52-60.

"Degrees of Freedom in Adaptive Modulation: A Unified View", Chung et al., IEEE Transactions on Communications, vol. 49, No. 9, Sep. 2001, pp. 1561-1571.

"Adaptive Resource Allocation in Composite Fading Environments", Vishwanath, Sriram et al., IEEE 2001, pp. 1312-1316.

"Power Allocation Algorithm in MC-CDMA", Zhu, Jianming et al., IEEE 2002, pp. 931-934.

"Performance Of An Adaptive Multicarrier CDMA System", Lok, Tiat M., IEEE 2002, pp. 1081-1085.

"Adaptive Data Transmission Based on Band-selection for MC-CDMA Systems", Kim, Jong-hyune, IEEE 2001, pp. 3125-3129.

"A Blockwise Loading Algorithm for the Adaptive Modulation Technique in OFDM Systems", Grunheid, Rainer et al., IEEE 2001, pp. 948-951.

"Adaptive OFDM for wideband radio channels", Czylwik, Andreas, IEEE 1996, pp. 713-718.

* cited by examiner

*Primary Examiner*—Chau Nguyen
*Assistant Examiner*—Rhonda Murphy
(74) *Attorney, Agent, or Firm*—Harrington & Smith, LLP

(57) ABSTRACT

In a multi-user frequency domain spreading downlink MC-CDMA system, a group of sub-carriers can be replaced by an equivalent sub-carrier of a conventional OFDM modem for purposes of resource allocation to improve the system performance. The chips for a given user are spread only within the group. Confinement insures synchronization between different users' chips that is essential to the recovering and separation of user symbols at the receiver. There is no limit imposed on the group size, which permits different spreading code lengths to be used for different scenarios or for performance tuning.

33 Claims, 5 Drawing Sheets

MULTIPLE USER ADAPTIVE MODULATION SCHEME FOR MC-CDMA

TECHNICAL FIELD

The field of the invention is wireless communications, in particular CDMA and OFDM systems for multiple users.

BACKGROUND OF THE INVENTION

Recently, a lot of attention has been devoted to Multi-carrier CDMA (MC-CDMA) as it potentially offers the advantages of both CDMA and OFDM. Several ways of uniting CDMA and OFDM have been reported [1,2]. Typically, data symbols are first spread by orthogonal codes, and then mapped into the sub-carriers of an OFDM modem in such a way that the spreading operation is performed in either time or frequency domain, or both. In this manner, multi-user access and time or frequency diversity gain are provided by the CDMA portion, while the OFDM portion offers resilience to frequency-selective fading. Most of the previous studies are mainly concerned with the features and performance of MC-CDMA schemes, how they compare to conventional DS-CDMA and OFDM, and detection strategies [1,2] (reference numerals in [ ] refer to the references listed at the end of the text).

It is known that a major benefit of MC-CDMA is that the frequency domain spreading process distributes a symbol over a number of sub-carriers, and since in a frequency-selective channel the sub-carrier channel functions have different amplitude and phase, the spreading takes advantage of the frequency diversity inherently present. Another feature of MC-CDMA is the easy multi-user access, orthogonal codes may be used to separate the symbols from different users. De-spreading at the receiver with the appropriate code readily recovers the data for a specific user.

The fact that under a frequency-selective fading channel the sub-channel frequency response functions are non-uniform has been well exploited in the past in OFDM systems. Specifically the topic of adaptive modulation, or bit loading, has been studied to make the most of the frequency diversity available [3,4]. The basic idea is simple—if a sub-carrier is in good condition it is loaded up with high order modulation symbols with little or no coding to improve the throughput; conversely if it is poor a low order, more robust modulation is used to improve the error performance. Typically a sub-channel's condition is assessed by its local SNR and loaded with a modulated symbol appropriate for the SNR. It has been shown that this technique can significantly improve the performance of an OFDM modem [3,4].

A similar idea may, in principle, be applied to a MC-CDMA system. However, very little has been done in this area. Almost all the reported MC-CDMA systems employ the same modulation (and coding) scheme across all the sub-carriers. While the uniform spreading process achieves some frequency diversity gain, further improvement may be obtained by adaptively loading up the sub-carriers according to their conditions. One problem in a multi-user scenario is that since different users have different channel conditions, a sub-carrier allocation that works for one user does not necessarily work, or even makes sense, for another user.

In a multi-user environment, the channel conditions are generally different from one user to another, and hence the sub-carrier bit allocations will also be different between the users. This creates a synchronization problem when the users' spread chips are summed at the transmitter, since the chips from the users' modulated symbols are no longer assigned to the same set of sub-carriers. Once the synchronization is lost, the receiver will no longer be able to recover the user symbols.

Little prior art concerning adaptive modulation or related topics for frequency domain spreading MC-CDMA systems is available. McCormick and Al-Susa [2] mentioned a scheme that uses short spreading codes, assembles the users in small groups and allocates each user its best selection of sub-carriers. Kim, Georghiades and Huang [5] presented a sub-band selection scheme to choose suitable sub-carriers for individual users to transmit data. This may be regarded as a simple adaptive scheme that only turns the sub-carriers on or off. Lok [6] achieved adaptation by varying a user's assigned spreading code according to noise and interference level. Zhu and Bar-Ness [7] proposed an algorithm to allocate power to the sub-carriers, the algorithm adapts the power only but not the modulation order, i.e. the number of bits loaded into each sub-carrier are not adapted. Vishwanath, Jafar and Goldsmith [8] suggested an iterative water-filling algorithm to maximize the sum of throughputs of the users when only one sub-carrier is allocated to a user. They also formulated the problem for the more general case when more than one sub-carriers are allocated to a user but no exact solution was given.

There is thus a need in the art to develop new adaptive schemes for multi-user downlink MC-CDMA systems that employ frequency domain spreading.

SUMMARY OF THE INVENTION

The invention relates to the application of modulation techniques to a group of two or more sub-carriers in a multi-user MC-CDMA system in which all the sub-carriers in the group are modulated in the same way, as though the group of sub-carriers were a single sub-carrier in an OFDM system.

A feature of the invention is a method of transmitting signals to M users on N sub-carriers by dividing the sub-carriers into G groups with one or more users on a group and a user having an option of using more than one group.

A feature of the invention is the generation for each user of an effective channel function for each group of sub-carriers for use in adaptive modulation of multiple user MC-CDMA systems.

Another feature of the invention is the calculation from the effective channel function of a group SNR of a group of sub-carriers that is regarded as being equivalent to a single sub-carrier in an OFDM system.

Another feature of the invention is the application of spreading the information for a user only within the groups of sub-carriers, thereby preserving synchronization.

Yet another feature of the invention is that each user in a multi-user system applies adaptive modulation to a group of sub-carriers, so that each user may transmit data at the appropriate symbol rate permitted by the channel conditions of that group of sub-carriers so as to optimize some performance criteria.

In accordance with one aspect, the present invention is a method of transmitting data in a wireless MC-CDMA system to a set of M users. The method includes providing a transmitter system with N sub-carriers divided into G groups, N and G being integers; determining an instantaneous group SNR that is calculated using an effective channel function for each user in each group of subcarriers; and for each user and in each group of sub-carriers, using the instantaneous SNR of an equivalent single sub-carrier as a metric for resource allocation at the transmitter.

In accordance with another aspect, the present invention is a transmitter for wirelessly transmitting data to a set of M users. The transmitter includes a modulator, circuitry for calculating, and resource allocation means. The modulator is for modulating N sub-carriers that are divided into G groups, where N and G are integers. The calculation circuitry is for calculating an instantaneous group SNR using an effective channel function for each user in each group of sub-carriers. The resource allocation means is for allocating, using the instantaneous SNR of an equivalent single sub-carrier as a metric, at least one resource for each user and in each group of sub-carriers.

In accordance with another aspect, the present invention is a program of machine-readable instructions, tangibly embodied on an information bearing medium and executable by a digital data processor, to perform actions directed toward transmitting data in a wireless multi-carrier spread spectrum communication system. The actions include providing a transmitter system with N subcarriers divided into G groups, where N and G being integers. They further include determining an instantaneous group SNR that is calculated using an effective channel function for each user in each group of sub-carriers. They also include, for each user and in each group of sub-carriers, using the instantaneous SNR of an equivalent single sub-carrier as a metric for resource allocation at the transmitter.

DETAILED DESCRIPTION

Figure 1:
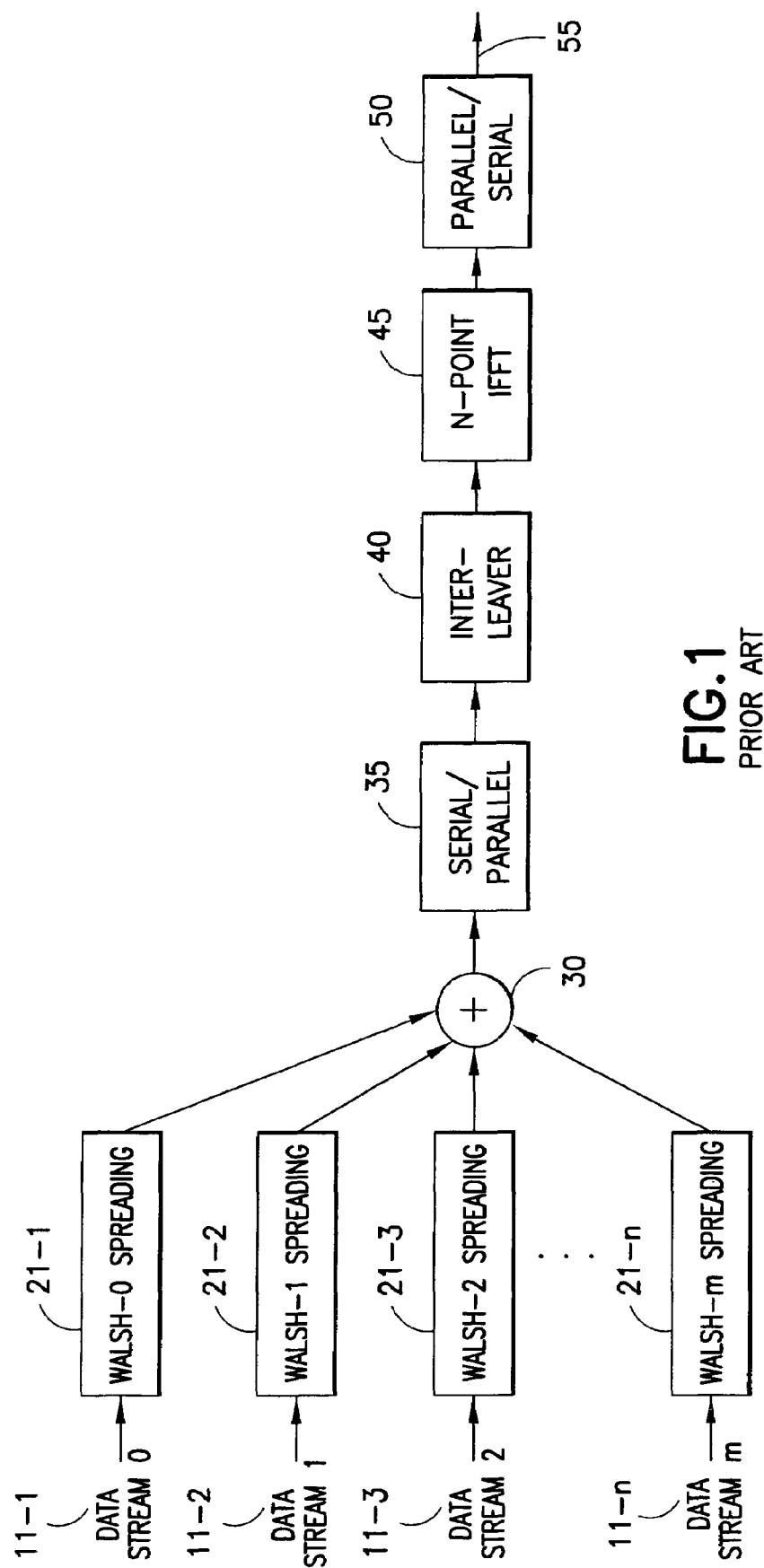
FIG. 1 is a block diagram of a frequency domain spreading MC-CDMA transmitter.

The invention is concerned with adaptive bit loading schemes for multi-user downlink MC-CDMA systems that employ frequency domain spreading. To insure synchronization between the users' chips, a configuration is suggested in which the sub-carriers are divided into groups of sub-carriers, and the spreading of an user modulated symbol is confined within a group of sub-carriers.

For the explicit use of adaptive modulation and resource allocation of bits and power, an analytical expression for the instantaneous SNR of a group of sub-carriers is derived. From the expression an effective channel function may be evaluated for each group of sub-carriers, and each group may then be interpreted as an equivalent sub-carrier of a conventional OFDM modem. The group of sub-carriers is then allocated to a modulated and coded data symbol in the same way as if they were a single OFDM sub-carrier. Those skilled in the art will appreciate that various forms of coding are available to the system manager. Spreading coding (e.g. Walsh codes) is used to spread the symbols over the available sub-carriers. Error correcting coding is available as an option to reduce the error rate. In the following claims, the term modulation and similar terms will be understood to include the minimum required coding for proper functioning and further coding is optional.

Based on this equivalent sub-carrier concept two illustrative adaptive schemes are developed to load up the groups of sub-carriers. They serve as examples to demonstrate the concept and those skilled in the art will readily be able to adapt the invention to other communications systems. The first scheme uses the SNR as a metric for resource allocation by comparing the instantaneous SNR of each group with a set of switching thresholds to determine the modulation level assigned to the group. Different users are allowed different modulation levels in the same group of sub-carriers. By adjusting the values of the switching thresholds, the performance may be altered, for example to meet a target BER criterion. The other scheme adopts an analytical approach and treats the bit loading issue as a parameter optimization problem. It attempts to maximize the data rate with constraints on the total power and instantaneous sub-carrier BER. Lagrange multiplier technique is invoked to solve for the bit and power assignments for multi-level QAM modulations that satisfy the constraints. Both adaptive schemes are found to offer significant improvement over fixed modulation.

The invention could be implemented in the base station of a MC-CDMA system via software or hardware. Either way a means of two-way signaling is required between the transmitter and receiver to carry the necessary control information, for example the channel conditions.

The deployment of adaptive modulation or bit loading improves the error performance and the data throughput that may be translated into a larger system capacity. The proposed grouping structure of sub-carriers to insure synchronization between users places no restrictions on the number of sub-carriers in a group. Moreover, the sub-carriers need not be consecutive to each other to be included in the same group. Unlike a prior art that is limited to short spreading codes only [2], there is no limit on the spreading code length.

The synchronization problem between different users' chips is solved by assembling the sub-carriers into groups and confining the spreading of chips with a given modulation level within the groups only. Such a configuration leads to the derivation of an analytical expression for the instantaneous SNR of a group of sub-carriers that is used for the explicit purpose of adaptive modulation and resource allocation. From the expression an effective channel function may be evaluated for each group of sub-carriers, and each group may then be interpreted as an equivalent sub-carrier of a conventional OFDM modem.

For example, if channel conditions improve (measured via the effective channel function), so that more bits can be loaded into the equivalent sub-carrier, all the sub-carriers in the group are modulated with the spread chips from a higher order modulated and coded data symbol.

Based on this equivalent sub-carrier concept two illustrative adaptive schemes are developed to load up the groups of sub-carriers. The two adaptive schemes just serve as examples, the derived analytical expression allows any adaptive bit/power loading schemes developed for OFDM to be deployed to MC-CDMA in the suggested configuration.

FIG. 1 shows a block diagram of a conventional downlink MC-CDMA transmitter according to the prior art. The user modulated symbols are first spread by orthogonal codes, with each chip mapped into a sub-carrier of the OFDM modem. Multi-user access is achieved via the orthogonal spreading codes, for example Walsh codes. Different users are assigned different spreading sequences. On the left, data streams 11-1 through 11-n are spread by corresponding codes 21-1 through 21-n. The chips from different users are summed together in unit 30 before being converted to parallel format in Serial/parallel converter 35 and then being optionally interleaved in unit 40 and mapped into the sub-carriers. Spreading is only performed in the frequency domain, so that the optionally interleaved data is transformed back to the time domain by an IFFT in unit 45. The time domain data is then converted back to serial format and sent to the RF section on line 55, where the user symbols are sent over all sub-carriers. If the length of the spreading code is smaller than the number of sub-carriers, multiple user symbols may be loaded into one OFDM symbol. At the receiver the received chips, after de-channelization and de-interleaving (optional), are de-spread with the signature sequence allocated to the user to recover the modulated symbols. A detector next converts the received modulated symbols into data bits.

Figure 2:
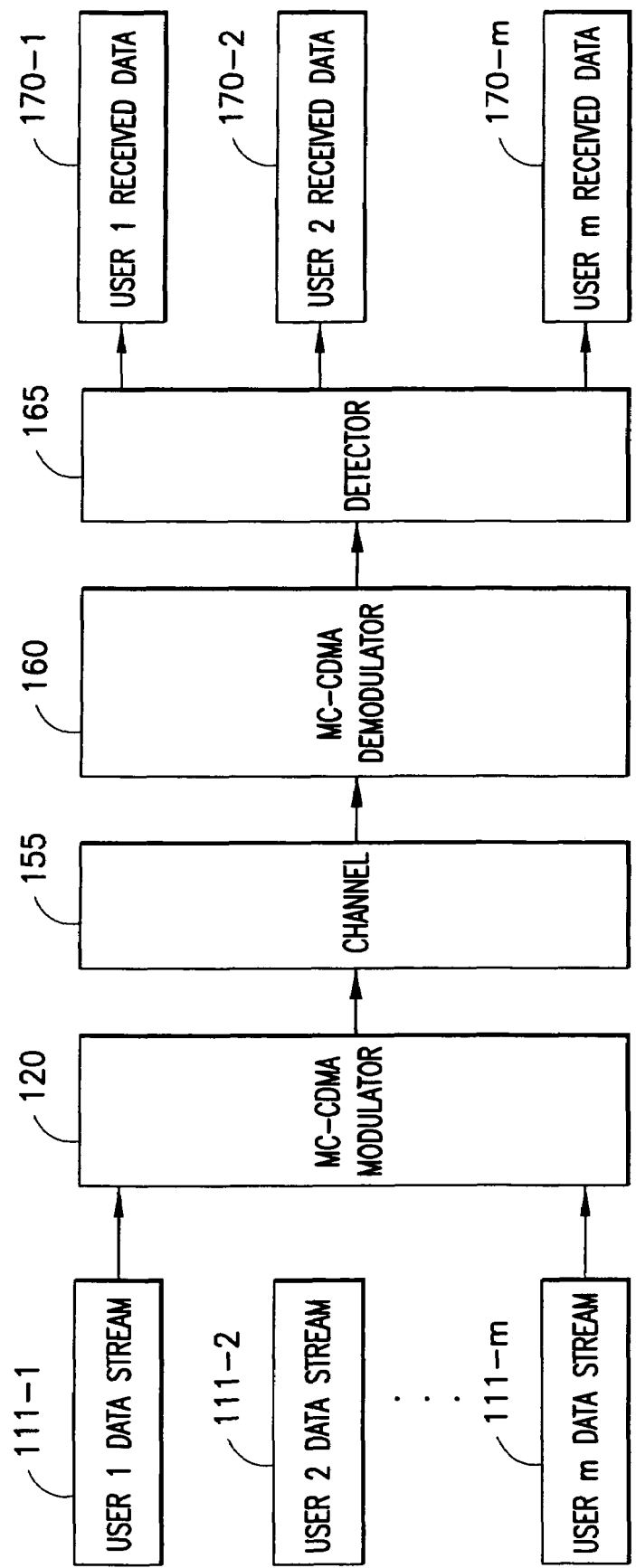
FIG. 2 is a block diagram of a single cell multi-user MC-CDMA system.

FIG. 2 shows a single-cell multi-user MC-CDMA system according to the invention. On the left, data streams 111-1 through 111-m and modulator 120 perform the function of FIG. 1 up to line 55. Box 155 represents the effects of the channel and demodulator 160 and detector generate a set of received data 170-1 through 170-m corresponding to the transmitted data on the left.

First consider a single user case. Let a user modulated symbol be $X_1$. After spreading with a spreading code belonging to a set of orthogonal codes (e.g. Walsh code) $W_{1i}$ of length L, without loss of generality $W_{ij} \in \{\pm 1\}$, it becomes a sequence $X_1 \cdot W_{1i}$, i=1, ..., L. Each element (i.e. chips) of the spread sequence is transmitted by a sub-carrier i (indexed within a group of L). Let the received sub-carrier symbol be $Y_i$, the sub-channel frequency function be $H_i$ and sub-channel noise be $N_i$. We may write, $$Y_i = X_1 \cdot W_{1i} \cdot H_i + N_i \qquad (1)$$

After a zero-forcing equalizer the received sub-carrier symbol becomes, $$\frac{Y_i}{H_i} = X_1 \cdot W_u + \frac{N_i}{H_i} \qquad (2)$$

An estimate $\tilde{X}_1$ of the original symbol $X_1$ is obtained by de-spreading the de-channelized symbols across the L sub-carriers, $$\tilde{X}_1 = \frac{1}{L}\sum_{i=1}^{L} X_1 \cdot W_u \cdot W_u + \frac{1}{L}\sum_{i=1}^{L} \frac{N_i}{H_i} \cdot W_u \qquad (3)$$
$$= X_1 + \frac{1}{L}\sum_{i=1}^{L} \frac{N_i}{H_i} \cdot W_u$$

since $W_{1i} \cdot W_{1i} = 1$, i=1, ..., L.

As the frequency function $H_i$ is non-uniform across the L sub-carriers in a frequency-selective fading channel, the de-spreading operation is seen to average out the noise across the sub-carriers.

Similar analysis may be extended to the general case of M users. Each of the M users data symbols may be recovered by de-spreading with their unique spreading sequences.

Let N be the number of sub-carriers in the system. For every user the N sub-carriers are first sequentially divided into G groups, With each group consisting of N/G consecutive sub-carriers. The spreading length L is chosen to be the same as the number of sub-carriers in a group, i.e. L=N/G, in all the groups. (Although the groups of sub-carrier are chosen to have the same spreading length, it is not a necessity for this invention. Moreover, the sub-carriers in a group do not need to be consecutive). For each user, the instantaneous SNR for the groups of L (=N/G) sub-carriers may be calculated in the following way.

From equation (2), the adjusted noise term after de-channelization in sub-carrier i is given by $$\frac{N_i}{H_i}$$

Assume the noise variance, or power, are identical in all the sub-carriers and let it be $\sigma^2$. The variance, or power, of the enhanced noise term in a sub-carrier i is thus $$\frac{\sigma^2}{|H_i|^2}.$$

After de-spreading, the adjusted noise term of the de-spread symbol is given by equation (3) as $$\frac{1}{L}\sum_{i=1}^{L} \frac{N_i}{H_i} \cdot W_u.$$

Since the variance of the sum of independently and identically distributed (i.i.d.) random variables with zero-mean is simply the sum of the variance of the individual variables, and $W_{1i}^2 = 1$, the noise power of the de-spread symbol is, $$i. \text{ Noise power} = \frac{1}{L^2}\sigma^2 \sum_{i=1}^{L} \frac{1}{|H_i|^2} \qquad (4)$$

For a symbol power of P spread across L sub-carriers, the power of each sub-carrier is set to $$\frac{P}{L}.$$

After de-spreading across the group of L sub-carriers the symbol power is $$\frac{P}{L}.$$

With such a scaling the instantaneous signal-to-noise ratio for the received symbol (referred to as the group SNR) is thus given by, $$\text{Instantaneous } SNR = \frac{P/L}{\frac{1}{L^2}\sigma^2 \sum_{i=1}^{L} \frac{1}{|H_i|^2}} = \frac{P \cdot L \Big/ \sum_{i=1}^{L} \frac{1}{|H_i|^2}}{\sigma^2} \quad (5)$$

Since each user will experience different channel conditions, the group SNR may be different for each user communicating on that group of sub-carriers.

From the equation it may be seen that the effective channel power attenuation for the symbol is given by $$\frac{L}{\sum_{i=1}^{L} \frac{1}{|H_i|^2}}.$$

Therefore it may be interpreted that the spreading and de-spreading operation simply average out the sub-channel squared magnitude response across the group of L sub-carriers, and that the group of sub-carriers may be replaced by a single equivalent sub-carrier with an effective channel function $|H_{eff}|^2$ of, $$\text{i. } |H_{eff}|^2 = \frac{L}{\sum_{i=1}^{L} \frac{1}{|H_i|^2}} \quad (6)$$

That is, an N sub-carrier MC-CDMA system (consisting of G groups of N/G sub-carriers) may be interpreted as an equivalent OFDM system with G sub-carriers. Such an interpretation effectively turns a MC-CDMA system (in its current configuration) into a multi-carrier system similar to a conventional OFDM system. Equation (6) allows the effective sub-channel power to noise ratio to be evaluated and conventional bit loading schemes based on channel state information to be implemented; i.e. bits will be loaded into the N/G sub-carriers in a group as though they were a single sub-carrier.

For example, a conventional bit loading scheme for OFDM may determine the number of bits loaded into a sub-carrier (i.e. modulation scheme (MS) used for a sub-carrier) by comparing the instantaneous SNR of the sub-carrier with a set of pre-defined switching thresholds. From the perspective of a single spreading code within a group, equation (5) allows the same scheme to be deployed to a MC-CDMA system by providing an effective group SNR so that the group of sub-carriers may be treated as if they were a single sub-carrier for the purpose of bit loading. A single modulated symbol using a particular MS (as in the OFDM) is now spread over all the sub-carriers in the group using an assigned spreading code.

Based on switching thresholds comparison, an illustrative bit loading scheme (referred to as "adaptive scheme 1") is presented below that aims for every user in a multi-user system to deploy adaptive modulation. Since different users have different channel conditions in general, the symbol rate of the users will be different. The scheme attempts to let every user to transmit as many symbols as his effective channel allows, it has no rate constraint or matching imposed. However, each user may alter its rate by consuming more than one of the spreading codes available. By adjusting the switching thresholds, the individual users' performance may further be tuned, for example to satisfy a certain target BER.

Assume the number of modulation schemes and the modulation schemes themselves are already pre-determined (by reasons of implementation complexity, hardware constraints etc). Let K be the number of modulation schemes available. The instantaneous SNR averaged over the sub-carriers in a group is evaluated from equation (5) and the value is used to classify the group into either one of the (K+1) classes—no transmission, modulation scheme 1 (MS1), modulation scheme 2 (MS2), etc. The groups labeled 'no transmission' (if any) are not loaded with any data. In each of the 'MS1' group, the N/G sub-carriers are loaded with the chips from a MS1-modulated symbol (one symbol is spread into L chips by the spreading code assigned to the user). Similarly chips from a MS2-modulated symbol are loaded into each member of the 'MS2' group of sub-carriers. This allocation process determines how many data bits are accommodated in an OFDM symbol for the user. For example, if there are 2 groups of 'no transmission' sub-carriers, 8 groups of 'MS1' and 6 groups of 'MS2', and QPSK & 16QAM are selected as 'MS1' & 'MS2' respectively, the number of data bits will be 0+2·8+4·6=40.

Figure 3:
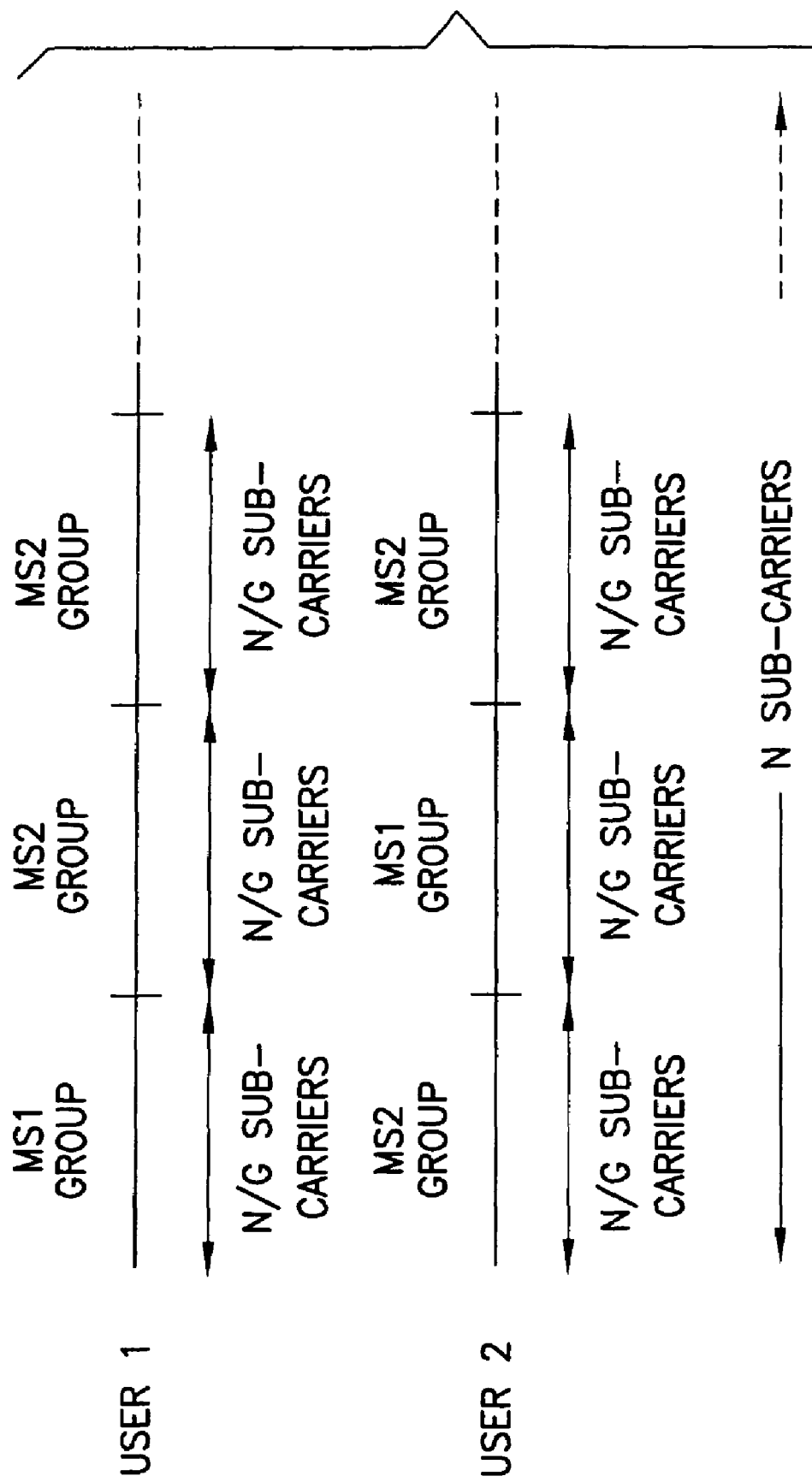
FIG. 3 shows an example of a modulation level assignment to groups of sub-carriers.

Using their respective effective channel function, the classification and allocation process is repeated for every user in the system. The chips generated are synchronously added together across the N sub-carriers before being passed into the IFFT operation. Data for each user thus start and stop at the same time on each sub-carrier. Since the boundaries of the groups of N/G sub-carriers (in both time and frequency) are the same for every user, synchronization amongst chips from different users is maintained in each of the groups, allowing the data symbols to be recovered at the receiver by de-spreading with the appropriate spreading codes. FIG. 3 shows an example of group modulation level assignments across the N sub-carriers for two users.

The Kth user has one or more spreading codes on one or multiple sub-carrier groups assigned to him, with a modulation scheme appropriate for his channel (referred to as "corresponding to the group"). His data is modulated with the appropriate MS before spread into chips with his assigned spreading code. The chips intended for all other users are added together before being placed on the groups of sub-carriers. Each receiver applies the correct spreading code to each assigned spreading code in each assigned group to recover the data symbols intended for that user. Referring to the example shown in FIG. 3, both users 1 & 2 are assigned with all the G groups of sub-carriers available, each group consists of N/G sub-carriers. A user 1's symbol is modulated with modulation scheme 1 (MS1), spread into N/G chips and mapped into the first group of N/G sub-carriers. Another user 1's symbol is modulated with MS2, spread into N/G chips and mapped into the second group of N/G sub-carriers etc. Similarly, a user 2's symbol is modulated with MS2, spread into N/G chips and mapped into the first group of N/G sub-carriers and so on. In each of the sub-carrier groups, the chips from different users are added together, in a sub-carrier by sub-carrier basis (meaning that all the chips for the nth sub-carrier are added together; all the chips for the (n+1)th sub-carrier are added together, etc.), before the summed chips are passed into the IFFT operation in the transmitter.

The steps of this first approach are as follows,

Divide the N sub-carriers sequentially into G groups, with L=N/G sub-carriers in each group.

Find the SNR in each group.

Compare the instantaneous SNR of each group with a pre-defined set of switching thresholds (say T1, T2, T3, . . . , with T1<T2<T3 etc). If it is below T1, the group of sub-carriers is classified as 'no transmission'. If it is above T1 but below T2, the group is classified as 'MS1'. If it is above T2 but below T3 the group is labeled as 'MS2' and so on.

The classifications in the preceding paragraph determines how many data bits can be accommodated in an effective OFDM symbol. 'No transmission' groups do not carry any data. The modulation schemes in other groups decide how many data bits each group carries; e.g. MS2 carries two data bits and MS3 carries three data bits etc.

The data bits are modulated by the proper modulation levels, spread with the appropriate spreading code, and loaded into the sub-carriers according to the group assignments.

The preceding steps are repeated for every user in the system, assuming that every user has a different effective channel condition and hence a different sub-carrier group assignment. The chips from the users are added synchronously across all the sub-carriers, on a sub-carrier-by-sub-carrier basis to form a combined OFDM symbol.

The OFDM symbol is then transmitted in the usual way.

At the receiver, after de-channelization, the sub-carrier symbols are grouped according to the classification established above. De-spreading is then performed in each group With the spreading code allocated for the specific user to obtain the modulated symbols. The user data bits are finally recovered by means of a suitable detector, e.g. an M-QAM slicer.

The above steps assume the transmitter has some means to communicate the relevant control information (e.g. group assignments) to the receiver, i.e. a control channel is available.

Equation (5) gives the group SNR with which the switching thresholds are compared to determine the modulation level in each group. Alternatively, as a very conservative approach, one could simply pick up the weakest sub-carrier in a group and use its SNR to represent the group's, although this would result in a sub-optimal performance.

An advantageous feature of this scheme is that the system performance may be altered by adjusting the switching thresholds that determine the modulation level in each group of sub-carriers. The thresholds may be set so that the system satisfies a certain standard (e.g. target BER), or to maximize the data throughput etc.

The alternative scheme (referred to as "adaptive scheme 2") is based on an analytical solution that aims to maximize the data rate of an individual user subject to a power constraint and an approximate BER bound. This serves as another example to demonstrate how the derived effective channel function (eq. 6) allows a bit/power loading scheme originally developed for OFDM to be deployed to MC-CDMA.

To insure synchronization between different users, the basic structure of this scheme is identical to that of adaptive scheme 1 —the N sub-carriers are sequentially divided into G groups, with each group consisting of N/G consecutive sub-carriers (although the invention places no limit that the sub-carriers in a group need to be consecutive) For each of the users, a modulated symbol is first spread by his signature spreading code of length L into L chips, and the chips from different users are then added synchronously before being loaded into the group of sub-carriers. At the receiver, each group of sub-carriers is de-spread with the appropriate spreading codes to recover the symbols for a given user. Such an arrangement not only maintains synchronization between the users' chips, it further allows the effective sub-channel function of a group of sub-carriers to be evaluated by equation (6).

This adaptive scheme 2 formulates the bit loading issue as a parameter optimization problem and finds an analytical solution to it. First, we start with using the BER approximation for M-QAM found in [9], $$\varepsilon_k \approx 0.2 \exp\left(\frac{-1.6|H_k|^2 P_k}{(2^{b_k} - 1)\sigma^2}\right) \tag{7}$$

where $\varepsilon_k$ is the BER, $|H_k|^2$ is the squared magnitude of the channel function, $P_k$ is the power and $b_k$ is the number of bits in the $k^{th}$ channel.

Using this expression as an equality instead of an approximation, we can solve for the power expression, $$1. \quad P_k = \frac{-(2^{b_k} - 1)\sigma^2}{1.6|H_k|^2} \ln(\varepsilon_k/0.2) \text{ for } \varepsilon_k < 0.2 \tag{8}$$

and the bit expression, $$1. \quad b_k = \log_2\left(1 - \frac{1.6|H_k|^2 P_k}{\sigma^2 \ln(\varepsilon_k/0.2)}\right) \text{ for } \varepsilon_k < 0.2 \tag{9}$$

Now, the optimization problem may be stated as, $$\text{minimize } -\sum_{k=1}^{N/G} b_k \tag{10}$$

$$\text{i. subject to } \sum_{k=1}^{N/G} P_k - P_{total} \leq 0$$

$$\varepsilon_k - \bar{\varepsilon}_k \leq 0 \text{ for } k = 1, 2, \ldots, N/G$$

where $b_k$ is the number of bits allocated to the $k^{th}$ (equivalent) sub-carrier, $P_k$ is the power assigned to the $k^{th}$ (equivalent) sub-carrier, $P_{total}$ is the total power available to the user, $\varepsilon_k$ and $\bar{\varepsilon}_k$ is the BER and BER bound respectively, and G is the total number of (equivalent) sub-carriers. The problem written as a Lagrangian is, $$J_R = -\sum_{k=1}^{N/G} b_k + \lambda \sum_{k=1}^{N/G} P_k \tag{11}$$

where $\lambda$ is the Lagrange multiplier. After solving for $P_k$ and $\lambda$, the expression for $P_k$ that maximizes the data rate is, $$\text{i. } P_k = \frac{\sigma^2 \ln(\overline{\varepsilon}_k/0.2)}{1.6|H_{\mathit{eff},k}|^2} + \frac{P_{total}}{N/G} - \frac{1}{N/G}\sum_{i=1}^{N/G}\frac{\sigma^2 \ln(\overline{\varepsilon}_i/0.2)}{1.6|H_{\mathit{eff},i}|^2} \quad (12)$$

Adjusting the transmitted power is referred to as scaling the signals and is done as part of the resource allocation process.

$|H_{\mathit{eff},k}|^2$ is the effective $k^{th}$ (equivalent) sub-carrier gain. The bit assignments may be obtained from a sub-carrier BER approximation equation for uncoded QAM from [9], $$\text{1. } b_k = \log_2\left(1 - \frac{1.6|H_{\mathit{eff},k}|^2 P_k}{\sigma^2 \ln(\overline{\varepsilon}_k/0.2)}\right) \quad (13)$$

For the present MC-CDMA configuration, each group of N/G sub-carriers corresponds to a single equivalent sub-carrier. For each of the users, equations (12) and (13) are first invoked to allocate the power and bits to each equivalent sub-carrier, the bits are then turned into modulated symbols, spread into chips, summed with other user's chips and loaded into the actual sub-carriers.

The steps of this scheme are as follows,

Divide the N sub-carriers sequentially into G groups, with N/G sub-carriers in each group.

Find the effective channel function of each group of sub-carriers from equation (6).

Feed the effective channel function, noise power, total power available for the user, an approximate target BER bound into equations (12) and (13) to obtain the bit and power allocations for the equivalent sub-carriers.

The allocations in the preceding paragraph determine how many data bits can be accommodated in an OFDM symbol. If $b_k=0$ for the k th (equivalent) sub-carrier, no bit is loaded into that sub-carrier. If $b_k=1$, one data bit is taken, modulated by BPSK (2-QAM) and loaded into the k th (equivalent) sub-carrier. If $b_k=2$, two data bits are taken, modulated by QPSK (4-QAM) and loaded into the k th (equivalent) sub-carrier, etc. In theory there is no upper limit to how many bits that can be loaded into a sub-carrier, but channel conditions and practical implementation issues often impose a limit on the modulation order.

The modulated symbols are spread with the appropriate spreading code and loaded into the actual sub-carriers. The power of each chip is set to L times less than that of the modulated symbol.

The steps above are repeated for every user in the system, assuming that every user has a different channel condition. The chips from the users are added synchronously across all the sub-carriers, in a sub-carrier-by-sub-carrier basis.

The OFDM symbol is transmitted in the usual way.

At the receiver, after de-channelization, the sub-carrier symbols are grouped according to the allocations established above. De-spreading is then performed in each group with the spreading code assigned for the specific user to obtain the modulated symbols. The user data bits are finally recovered by means of a detector, e.g. an M-QAM slicer.

The above steps assume the transmitter has some means to communicate the relevant control information to the receiver, for instance a control channel is available.

Simulations were performed under a multi-user, single cell scenario to verify the two example adaptive schemes and to compare their performance with fixed modulations.

The simulation parameters are as follows:
Sampling frequency=1.25 MHz
FFT/IFFT length=512
Cyclic prefix length=20
OFDM symbol size=512+20=532
OFDM symbol duration=532*1/1.25=425.6 usec
Modulation—QPSK/16QAM for scheme 1, BPSK/QPSK/8QAM/16QAM/32QAM/64QAM for scheme 2
Orthogonal code—Walsh-32 codes
Number of sub-carriers in a group—32
Number of sub-carrier groups in an OFDM symbol—512/32=16
Carrier frequency=2 GHz
Channel models used—5-path Vehicular A (30 km/hr for scheme 1, 3 km/hr for scheme 2)
Number of users simulated—32, 16 and 8

To simplify the simulation set up, only the first 3 users are simulated with different channel conditions (all with the same Vehicular A profile but different realizations), and other users are assumed to have the same channel (also Vehicular A). This does not affect the generality and multi-user applicability of the proposed schemes, but significantly reduces the simulation effort. For each of the users, the data bits are modulated, spread, allocated to the sub-carriers, and the user chips are summed together according to the schemes.

Figure 4:
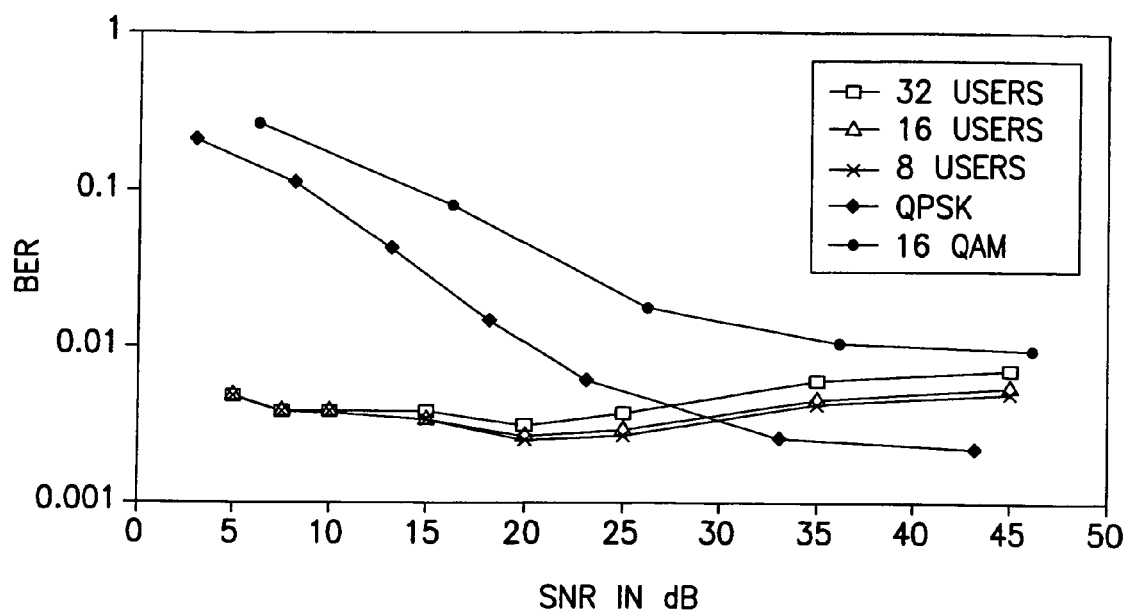
FIG. 4 shows a BER comparison of a first embodiment with fixed modulations.
Figure 5:
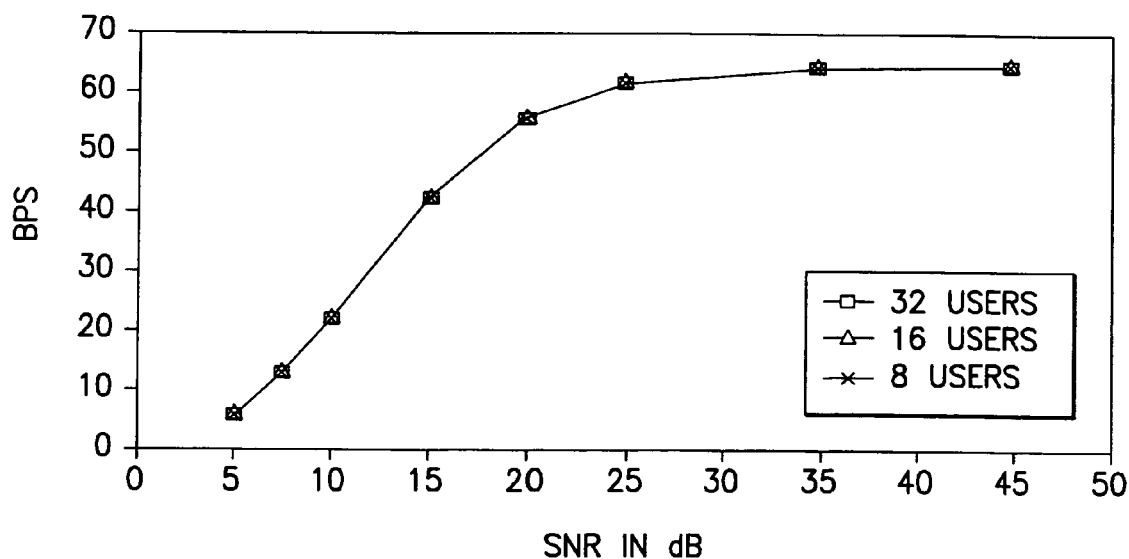
FIG. 5 shows throughput performance of the first embodiment.

Adaptive scheme 1 was tested with two modulation levels—QPSK and 16QAM. Two switching thresholds are thus needed to determine the switching of each group of sub-carriers between no transmission, QPSK and 16QAM. The thresholds were set according to the familiar target BER approach [3] with a target BER of 1% (T1=7 dB, T2=13.5 dB). The symbol power was unity per user. At the receiver, the de-channelized symbols are de-spread with the appropriate spreading code to recover the symbols for each of the user stream. FIGS. 4 and 5 show the BER and bits-per-OFDM-symbol-per-user (BPS) results for one of the users when the system was loaded with 32, 16 or 8 users. Also plotted in FIG. 4 are the BER curves for fixed QPSK and 16QAM modulations. There it is easily seen that the adaptive scheme offers a significant improvement, lowering the BER to within the target of 1% across all SNRs when the fixed modulation schemes fail.

Figure 6:
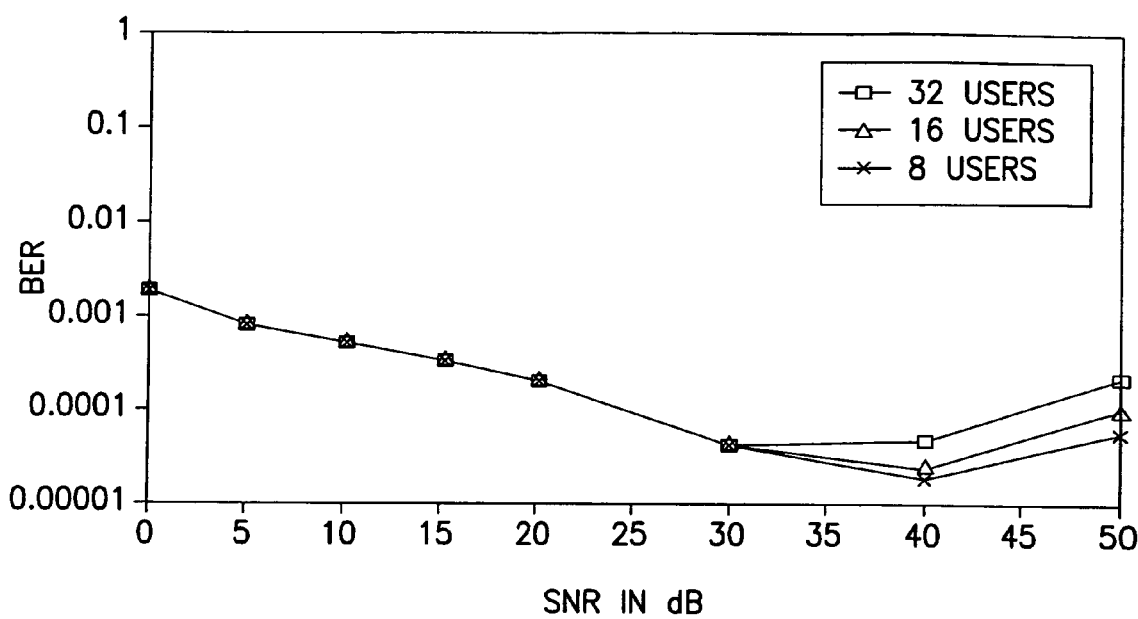
FIG. 6 shows BER performance of a second embodiment.
Figure 7:
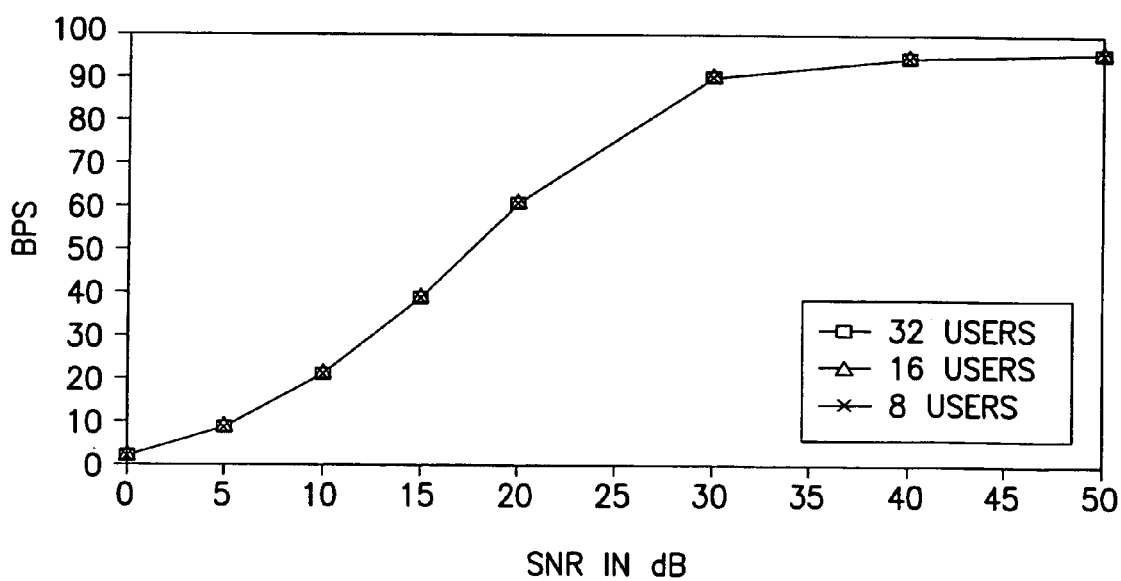
FIG. 7 shows throughput performance of the second embodiment.

Adaptive scheme 2 was tested with six modulation levels—BPSK, QPSK, 8QAM, 16QAM, 32QAM and 64QAM. The highest order of modulation allowed was 64QAM, i.e. a maximum of 6 bits were loaded into a single (equivalent) sub-carrier. If $b_k$ returned by equation (13) was greater than 6, it was limited to 6. No switching thresholds are required in this scheme, instead the operating parameters are just the total power available and an approximate target BER bound. For a total of 512 actual sub-carriers or 16 equivalent sub-carriers, a maximum of 6*16=96 bits per user are accommodated in an OFDM symbol. The target BER was set to 0.1% and the average power per user symbol was unity, i.e. a total power of 16 was allowed per user per OFDM symbol. FIGS. 6 and 7 show the BER and BPS results for one of the users when the system was loaded with 32, 16 or 8 users. It is found that the adaptive scheme successfully maintained the target BER over the SNR range while maximizing the rate.

Those skilled in the art will appreciate that the inventive method may be applied to a mobile station or handset, with appropriate modifications to account for the fact that the user's station will not be able to take into account or to modify the transmissions of other users and can only adjust its own transmissions.

Although the invention has been described with respect to a limited number of embodiments, those skilled in the art will appreciate that other embodiments may be constructed within the spirit and scope of the following claims.

REFERENCES

[1] R. Prasad and S. Hara, "An Overview of Multi-Carrier CDMA", Proceedings of IEEE 4$^{th}$ International Symposium on Spread Spectrum Techniques and Applications, September 1996, Vol 1, pp. 22–25.

[2] A. C. McCormick and E. A. Al-Susa, "Multicarrier CDMA for future generation mobile communication", IEE Electronics and Communication Journal, April 2002, pp. 52–60.

[3] A. Czylwik, "Adaptive OFDM for Wideband Radio Channels", IEEE GLOBECOM 96, Nov. 18–22, 1996, Volume 1, pp. 713–718.

[4] R. Grunheid, E. Bolinth and H. Rohling, "A Blockwise Loading Algorithm for the Adaptive Modulation Technique in OFDM Systems", IEEE 54$^{th}$ Vehicular Technology Conference, October 2001, Volume 2, pp. 948–951.

[5] J. Kim, C. N. Georghiades and G. M. Huang, "Adaptive Data Transmission Based on Band-selection for MC-CDMA Systems", IEEE GLOBECOM 01, Nov. 25–29, 2001, Volume 5, pp. 3125–3129.

[6] T. M. Lok, "Performance of an Adaptive Multicarrier CDMA System", The 8$^{th}$ International Conference on Communication Systems (ICCS) 2002, Nov. 25–28, 2002, pp. 1081–1085.

[7] J. Zhu and Y. Bar-Ness, "Power Allocation Algorithm in MC-CDMA", IEEE International Conference on Communications, Apr. 28-May 2, 2002, New York, USA, Volume 2, pp. 931–935.

[8] S. Vishwanath, S. A. Jafar and A. Goldsmith, "Adaptive Resource Allocation in Composite Fading Environments", IEEE GLOBECOM 01, Nov. 25–29, 2001, Volume 2, pp. 1312–1316

[9] S. T. Chung and A. Goldsmith, "Degrees of Freedom in Adaptive Modulation: a Unified View", IEEE Transactions on Communications, Volume 49, September 2001, pp. 1561–1571.

We claim:

1. A method of transmitting data in a wireless multi carrier system to a set of M users comprising the steps of:
providing a transmitter system with N sub-carriers divided into G groups, N and G each being integers greater than one;
determining an instantaneous group SNR that is calculated using an effective channel function for each user in each group of sub-carriers; and
for each user and in each group of sub-carriers, using the instantaneous SNR of an equivalent single sub-carrier as a metric for resource allocation at the transmitter.

2. A method as in claim 1, further comprising:
receiving the data at the MC-CDMA receiver, and demodulating the received data using a demodulator that corresponds to the resource allocated at the transmitter.

3. A method according to claim 1, for each user, using the instantaneous group SNR of the user's group of sub-carriers, calculating bit and power allocation for each equivalent sub-carrier and modulating each equivalent sub-carrier with a corresponding number of data bits, corresponding to the user's group SNR.

4. A method according to claim 1, further comprising the step of, for each user and in each group of sub-carriers, regarding the instantaneous group SNR as the instantaneous SNR of an equivalent single sub-carrier to the group.

5. A method of transmitting data in a wireless multi carrier system to a set of M users comprising:
providing a transmitter system with N sub-carriers divided into G groups, N and G each being integers greater than one;
determining an instantaneous group SNR that is calculated using an effective channel function for each user in each group of sub-carriers;
for each user and in each group of sub-carriers, using the instantaneous SNR of an equivalent single sub-carrier as a metric for resource allocation at the transmitter; and
for each user, comparing the instantaneous group SNR of each group of sub-carriers with a pre-defined set of switching thresholds to determine bit allocations for the equivalent sub-carrier, and modulating each equivalent sub-carrier with a corresponding number of data bits, corresponding to the user's group SNR.

6. A method according to claim 5, in which user data bits are modulated with a modulation scheme corresponding to that user's group SNR and spread in frequency over said sub-carriers belonging to that user's group.

7. A method according to claim 6, further comprising calculating for each user an effective channel function;
calculating from said effective channel function a group SNR of the sub-carriers in said effective channel function; and
comparing the instantaneous group SNR of each group of sub-carriers with a pre-defined set of switching thresholds to determine the bit allocations for the equivalent sub-carrier, and modulating each equivalent sub-carrier with a corresponding number of data bits, corresponding to said group SNR.

8. A method according to claim 5, in which
any groups of sub-carriers having a group SNR below a first switching threshold are not modulated;
at least one group of sub-carriers having a first group SNR above said first switching threshold is modulated with a first number of data bits according to a first modulation scheme; and
at least one group of sub-carriers of said G groups having a second group SNR next above said first group SNR is modulated with a second number of data bits according to a second modulation scheme.

9. A method according to claim 5, in which at least one switching threshold between at least two SNRs is chosen to satisfy a performance criterion of a system.

10. A method of transmitting data in a wireless multi carrier system to a set of M users comprising:
providing a transmitter system with N sub-carriers divided into G groups, N and G each being integers greater than one;
determining an instantaneous group SNR that is calculated using an effective channel function for each user in each group of sub-carriers;
for each user and in each group of sub-carriers, using the instantaneous SNR of an equivalent single sub-carrier as a metric for resource allocation at the transmitter; and
adding chips from all users synchronously across all the sub-carriers in said G groups, on a sub-carrier-by-sub-carrier basis and then transmitting an OFDM symbol formed by the addition of said chips.

11. A method according to claim 10, in which user data bits for each user in each group of modulated sub-carriers are modulated by a modulation scheme corresponding to the user's group SNR, then spread with a spreading code associated with that user, and loaded into the sub-carriers of the user's group.

12. A transmitter for wirelessly transmitting data to a set of M users comprising:
   a modulator for modulating N sub-carriers that are divided into G groups, N and G each being integers greater than one;
   circuitry for calculating an instantaneous group SNR using an effective channel function for each user in each group of sub-carriers; and
   resource allocation means for allocating, using said instantaneous SNR of an equivalent single sub-carrier as a metric, at least one resource for each user and in each group of sub-carriers.

13. A transmitter according to claim 12, wherein the circuitry for calculating further calculates, for each user and in each group of sub-carriers, said SNR is calculated by regarding said instantaneous group SNR as the instantaneous SNR of an equivalent single sub-carrier.

14. A transmitter according to claim 12, wherein the circuitry for calculating further calculates, for each user, said effective channel function and calculating therefrom said group SNR of the sub-carriers in said effective channel function.

15. A transmitter according to claim 12 disposed in a mobile station.

16. A transmitter according to claim 12 disposed in a base station of a cellular communication system.

17. A transmitter for wirelessly transmitting data to a set of M users comprising:
   a modulator for modulating N sub-carriers that are divided into G groups, N and G being integers;
   circuitry for calculating an instantaneous group SNR using an effective channel function for each user in each group of sub-carriers; and
   resource allocation means for allocating, using said instantaneous SNR of an equivalent single sub-carrier as a metric, at least one resource for each user and in each group of sub-carriers; and
   means for comparing the instantaneous group SNR of each group of sub-carriers received by each user with a pre-defined set of switching thresholds to determine the bit allocations for the equivalent sub-carriers of said each user;
   wherein the modulator operates to modulate each equivalent sub-carrier with a number of data bits corresponding to said group SNR.

18. A transmitter according to claim 17, wherein the modulator modulates data bits with a modulation scheme corresponding to said group SNR, and the transmitter further comprising a spreader for spreading the unmodulated data bits in frequency over said sub-carriers belonging to said group.

19. A transmitter according to claim 18, wherein the circuitry for calculating further calculates bit and power allocation, for each user using the instantaneous group SNR of each group of sub-carriers, for each equivalent sub-carrier and modulating each equivalent sub-carrier with a corresponding number of data bits, corresponding to said group SNR.

20. A transmitter according to claim 17, in which the modulator does not modulate any groups of sub-carriers having a group SNR below a first switching threshold;
   the modulator modulates with a first number of data bits according to a first modulation scheme at least one group of sub-carriers having a first group SNR above said first switching threshold; and
   the modulator modulates with a second number of data bits according to a second modulation scheme at least one group of sub-carriers of said G groups having a second group SNR next above said first group SNR.

21. A transmitter according to claim 17, in which the circuitry for calculating operates to select at least one switching threshold between at least two SNRs is chosen so as to satisfy a performance criterion.

22. A transmitter for wirelessly transmitting data to a set of M users comprising:
   a modulator for modulating N sub-carriers that are divided into G groups, N and G each being integers greater than one;
   circuitry for calculating an instantaneous group SNR using an effective channel function for each user in each group of sub-carriers;
   resource allocation means for allocating, using said instantaneous SNR of an equivalent single sub-carrier as a metric, at least one resource for each user and in each group of sub-carriers; and
   means for adding chips from all users synchronously across all the sub-carriers in said G groups, on a sub-carrier-by-sub-carrier basis and then transmitting an OFDM symbol formed by the addition of said chips.

23. A transmitter as in claim 22, further comprising:
   at least one MC-CDMA receiver for receiving data over resources allocated using an instantaneous SNR of an equivalent single sub-carrier as a metric; and
   a demodulator that corresponds to the allocated resources for demodulating the received data.

24. A program of machine-readable instructions, tangibly embodied on an information bearing medium and executable by a digital data processor, to perform actions directed toward transmitting data in a wireless multi-carrier communication system, the actions comprising:
   providing a transmitter system with N sub-carriers divided into G groups, N and G each being integers greater than one;
   determining an instantaneous group SNR that is calculated using an effective channel function for each user in each group of sub-carriers; and
   for each user and in each group of sub-carriers, using the instantaneous SNR of an equivalent single sub-carrier as a metric for resource allocation at the transmitter.

25. A program of machine-readable instructions according to claim 24, wherein the actions further comprise:
   receiving the data at an MC-CDMA receiver, and
   demodulating the received data using a demodulator that corresponds to the resource allocated at the transmitter.

26. A program of machine-readable instructions according to claim 24, wherein the actions further comprise:
   for each user and in each group of sub-carriers, regarding the instantaneous group SNR as the instantaneous SNR of an equivalent single sub-carrier to the group.

27. A program of machine-readable instructions according to claim 24, wherein the actions further comprise:
   modulating user data bits for each user in each group of modulated sub-carriers by a modulation scheme corresponding to the user's group SNR; and
   spreading the modulated user bits with a spreading code associated with that user; and
   loading the spread and modulated user bits into the sub-carriers of the user's group.

28. A program of machine-readable instructions, tangibly embodied on an information bearing medium and executable by a digital data processor, to perform actions directed toward transmitting data in a wireless multi-carrier communication system, the actions comprising:

provyding a transmitter system with N sub-carriers divided into G groups, N and G each being integers greater than one;

determining an instantaneous group SNR that is calculated using an effective channel function for each user in each group of sub-carriers; and for each user and in each group of sub-carriers, using the instantaneous SNR of an equivalent single sub-carrier as a metric for resource allocation at the transmitter;

for each user, comparing the instantaneous group SNR of each group of sub-carriers with a pre-defined set of switching thresholds to determine bit allocations for the equivalent sub-carrier; and modulating each equivalent sub-carrier with a corresponding number of data bits, corresponding to the user's group SNR.

29. A program of machine-readable instructions according to claim 28, in which user data bits are modulated with a modulation scheme corresponding to that user's group SNR and spread in frequency over said sub-carriers belonging to that user's group.

30. A program of machine-readable instructions according to claim 29, wherein for each user using the instantaneous group SNR of the user's group of sub-carriers, calculating bit and power allocation for each equivalent sub-carrier and modulating each equivalent sub-carrier with a corresponding number of data bits, corresponding to the user's group SNR.

31. A program of machine-readable instructions according to claim 28, wherein the actions further comprise:

any groups of sub-carriers having a group SNR below a first switching threshold are not modulated;

modulating at least one group of sub-carriers of said G groups, having a first group SNR above said first switching threshold, with a first number of data bits according to a first modulation scheme; and modulating at least one group of sub-carriers of said G groups, having a second group SNR next above said first group SNR, with a second number of data bits according to a second modulation scheme.

32. A program of machine-readable instructions according to claim 28, wherein the actions further include selecting at least one switching threshold between at least two SNRs so as to satisfy a performance criterion of a system.

33. A program of machine-readable instructions, tangibly embodied on an information bearing medium and executable by a digital data processor, to perform actions directed toward transmitting data in a wireless multi-carrier spread spectrum communication system, the actions comprising:

providing a transmitter system with N sub-carriers divided into G groups, N and G each being integers greater than one;

determining an instantaneous group SNR that is calculated using an effective channel function for each user in each group of sub-carriers; and for each user and in each group of sub-carriers, using the instantaneous SNR of an equivalent single sub-carrier as a metric for resource allocation at the transmitter;

modulating user data bits for each user in each group of modulated sub-carriers by a modulation scheme corresponding to the user's group SNR;

spreading the modulated user bits with a spreading code associated with that user;

loading the spread and modulated user bits into the sub-carriers of the user's group by adding chips from all users synchronously across all the sub-carriers in said G groups, on a sub-carrier-by-sub-carrier basis; and transmitting an OFDM symbol formed by the addition of said chips.

* * * * *